US011593799B2

(12) United States Patent
Carpenter et al.

(10) Patent No.: US 11,593,799 B2
(45) Date of Patent: Feb. 28, 2023

(54) MESSAGE-LESS B2B TRANSACTION PROCESSING

(71) Applicant: EMC IP Holding Company LLC, Hopkinton, MA (US)

(72) Inventors: Donal Carpenter, Wicklow (IE); Carlos Martins Rodrigues, Shankhill (IE); Tomislav Lokas, Ranelagh (IE)

(73) Assignee: EMC IP Holding Company LLC, Hopkinton, MA (US)

( * ) Notice: Subject to any disclaimer, the term of this patent is extended or adjusted under 35 U.S.C. 154(b) by 546 days.

(21) Appl. No.: 16/265,323

(22) Filed: Feb. 1, 2019

(65) Prior Publication Data

US 2020/0250662 A1 Aug. 6, 2020

(51) Int. Cl.
*G06Q 20/38* (2012.01)
*G06Q 30/04* (2012.01)
(Continued)

(52) U.S. Cl.
CPC ........... *G06Q 20/389* (2013.01); *G06Q 30/04* (2013.01); *G06Q 30/0635* (2013.01); *G06Q 2220/00* (2013.01)

(58) Field of Classification Search
CPC ................. G06Q 20/389; G06Q 30/04; G06Q 30/06–0645; G06Q 30/08; G06Q 50/01; G06Q 2220/00
See application file for complete search history.

(56) References Cited

U.S. PATENT DOCUMENTS 8,326,754 B2 * 12/2012 Bandych .............. G06Q 20/102
705/40
10,445,698 B2 * 10/2019 Hunn .................... G06F 16/219
(Continued)

FOREIGN PATENT DOCUMENTS

AU 2016226026 B2 * 4/2020 ........... G06Q 40/128
WO WO-2020145964 A1 * 7/2020 ............. G06Q 30/06

OTHER PUBLICATIONS

Swan, "Blockchain Blueprint for a New Economy," O'Reilly Media, Inc., Sebastopol, CA, Feb. 2015. (Year: 2015).*
(Continued)

*Primary Examiner* — Adam L Levine
(74) *Attorney, Agent, or Firm* — Daly, Crowley, Mofford & Durkee, LLP

(57) ABSTRACT

A method is provided for recording purchase transactions, including: receiving a purchase order request that is associated with a purchase order, the purchase order request being received from a purchaser-side system, the purchase order request including purchase information identifying a product, a product quantity, and a first order identifier that is assigned to the purchase order by the purchaser-side system; generating a transaction document in response to the purchase order request, including the purchase information into the transaction document, and recording the transaction document in a document sharing platform or shared cryptographically protected ledger; and progressively updating the transaction document with information provided by the purchaser-side system and a seller-side system as the purchase order is being fulfilled, wherein each update to the transaction document is recorded in the cryptographically protected ledger.

16 Claims, 9 Drawing Sheets

(51) Int. Cl.
  *G06Q 30/06*    (2012.01)
  *G06Q 30/0601*  (2023.01)

(56) References Cited

U.S. PATENT DOCUMENTS

| | | | |
|---|---|---|---|
| 11,093,649 B2* | 8/2021 | Dunjic | G06F 16/1834 |
| 11,176,550 B2* | 11/2021 | Vintila | G06Q 40/02 |
| 2017/0046709 A1* | 2/2017 | Lee | G06Q 30/0214 |
| 2018/0025442 A1* | 1/2018 | Isaacson | G06F 3/048 |
| | | | 705/26.62 |
| 2019/0139136 A1* | 5/2019 | Molinari | G06F 21/645 |
| 2020/0151804 A1* | 5/2020 | Butters | G06K 9/00469 |

OTHER PUBLICATIONS

Caro, "Blockchain-based Traceability in Agri-Food Supply Chain Management: A Practical Implementation," 2018 IoT Vertical and Topical Summit on Agriculture—Tuscany (IoT Tuscany), pp. 1-4, May 1, 2018. (Year: 2018).*

* cited by examiner

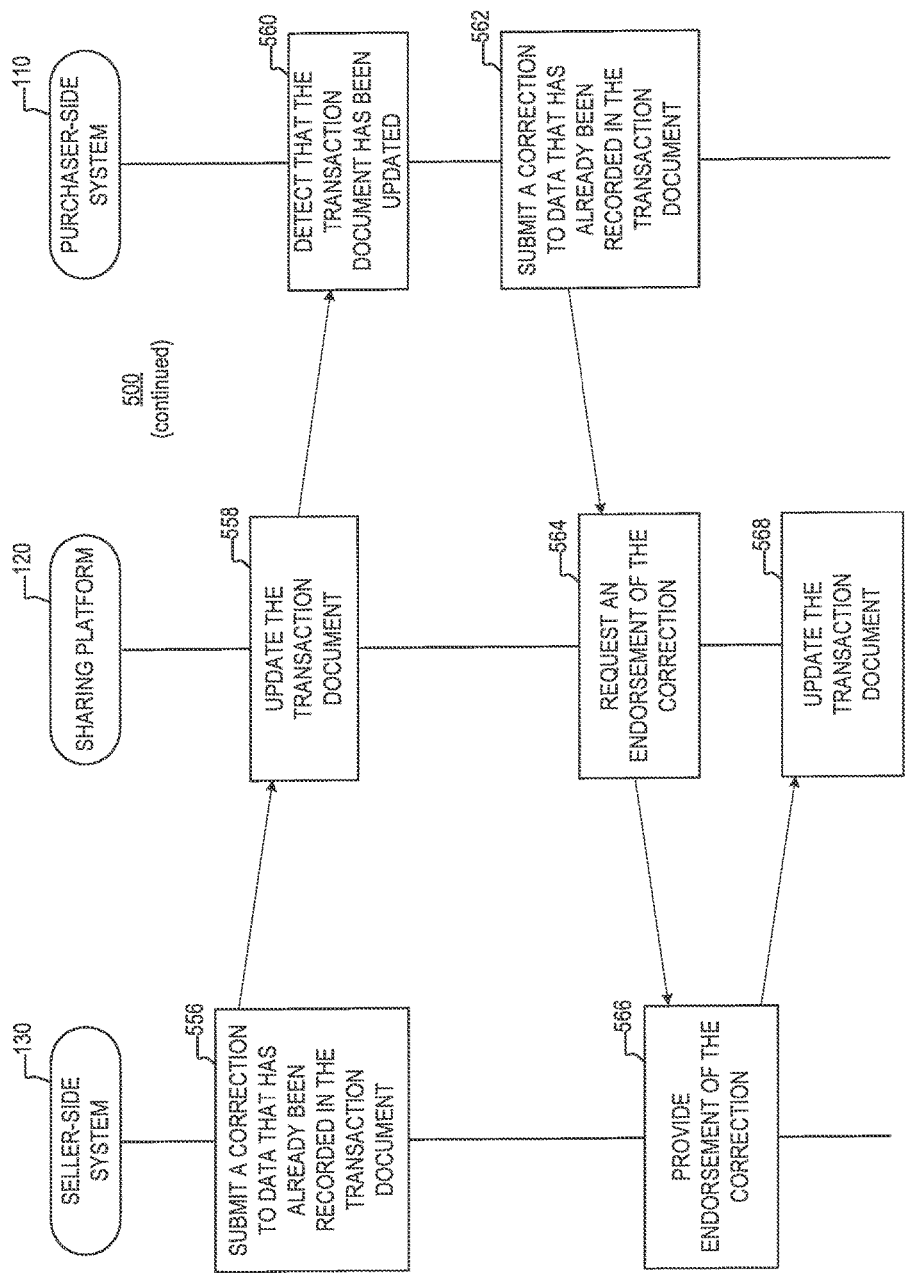

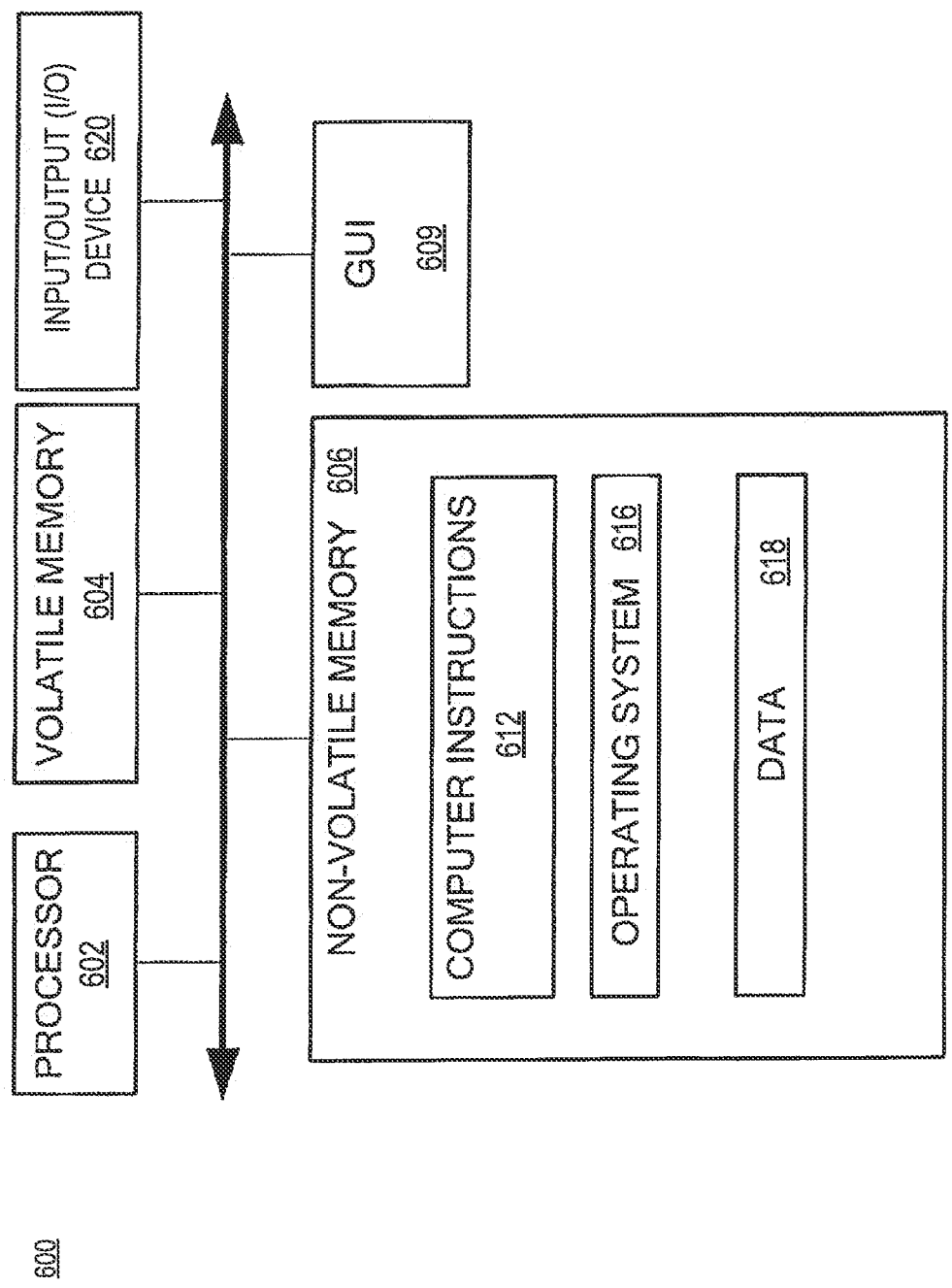

MESSAGE-LESS B2B TRANSACTION PROCESSING

BACKGROUND

Business-to-Business (B2B) systems are used by business organizations to execute various commercial transactions. For example, B2B systems may be used to execute purchase transactions in which one business organization purchases products from another business organization. In such applications, B2B systems may be used to exchange purchase orders, invoices, shipping information, and/or any other suitable information that is required for the purchase transactions to take place. In many business organizations, the overall volume of B2B transactions can be equal or higher than the volume of business-to-customer transactions. Accordingly, B2B systems may constitute an essential part of the operation of various business organizations.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method is provided for recording purchase transactions, comprising: receiving a purchase order request that is associated with a purchase order, the purchase order request being received from a purchaser-side system, the purchase order request including purchase information identifying a product, a product quantity, and a first order identifier that is assigned to the purchase order by the purchaser-side system; generating a transaction document in response to the purchase order request, including the purchase information into the transaction document, and recording the transaction document in a cryptographically protected ledger, and progressively updating the transaction document with information provided by the purchaser-side system and a seller-side system as the purchase order is being fulfilled, wherein each update to the transaction document is recorded in the cryptographically protected ledger.

According to aspects of the disclosure, a system is provided comprising: a memory; and at least one processor operatively coupled to the memory, the at least one processor being configured to perform the operations of: receiving a purchase order request that is associated with a purchase order, the purchase order request being received from a purchaser-side system, the purchase order request including purchase information identifying a product, a product quantity, and a first order identifier that is assigned to the purchase order by the purchaser-side system; generating a transaction document in response to the purchase order request, including the purchase information into the transaction document, and recording the transaction document in a cryptographically protected ledger and progressively updating the transaction document with information provided by the purchaser-side system and a seller-side system as the purchase order is being fulfilled, wherein each update to the transaction document is recorded in the cryptographically protected ledger.

According to aspects of the disclosure, a non-transitory computer-readable medium is disclosed that is configured to store one or more processor executable instructions, which when executed by one or more processors cause the one or more processors to perform the operations of: receiving a purchase order request that is associated with a purchase order, the purchase order request being received from a purchaser-side system, the purchase order request including purchase information identifying a product, a product quantity, and a first order identifier that is assigned to the purchase order by the purchaser-side system; generating a transaction document in response to the purchase order request, including the purchase information into the transaction document, and recording the transaction document in a cryptographically protected ledger, and progressively updating the transaction document with information provided by the purchaser-side system and a seller-side system as the purchase order is being fulfilled, wherein each update to the transaction document is recorded in the cryptographically protected ledger.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

FIG. 5D is a sequence diagram of an example of a process, according to aspects of the disclosure; and FIG. 6 is a diagram of an example of a process, according to aspects of the disclosure;

DETAILED DESCRIPTION

Before describing embodiments of the concepts, structures, and techniques sought to be protected herein, some terms are explained. In some embodiments, the term "I/O request" or simply "I/O" may be used to refer to an input or output request. In some embodiments, an I/O request may refer to a data read or write request.

Figure 1:
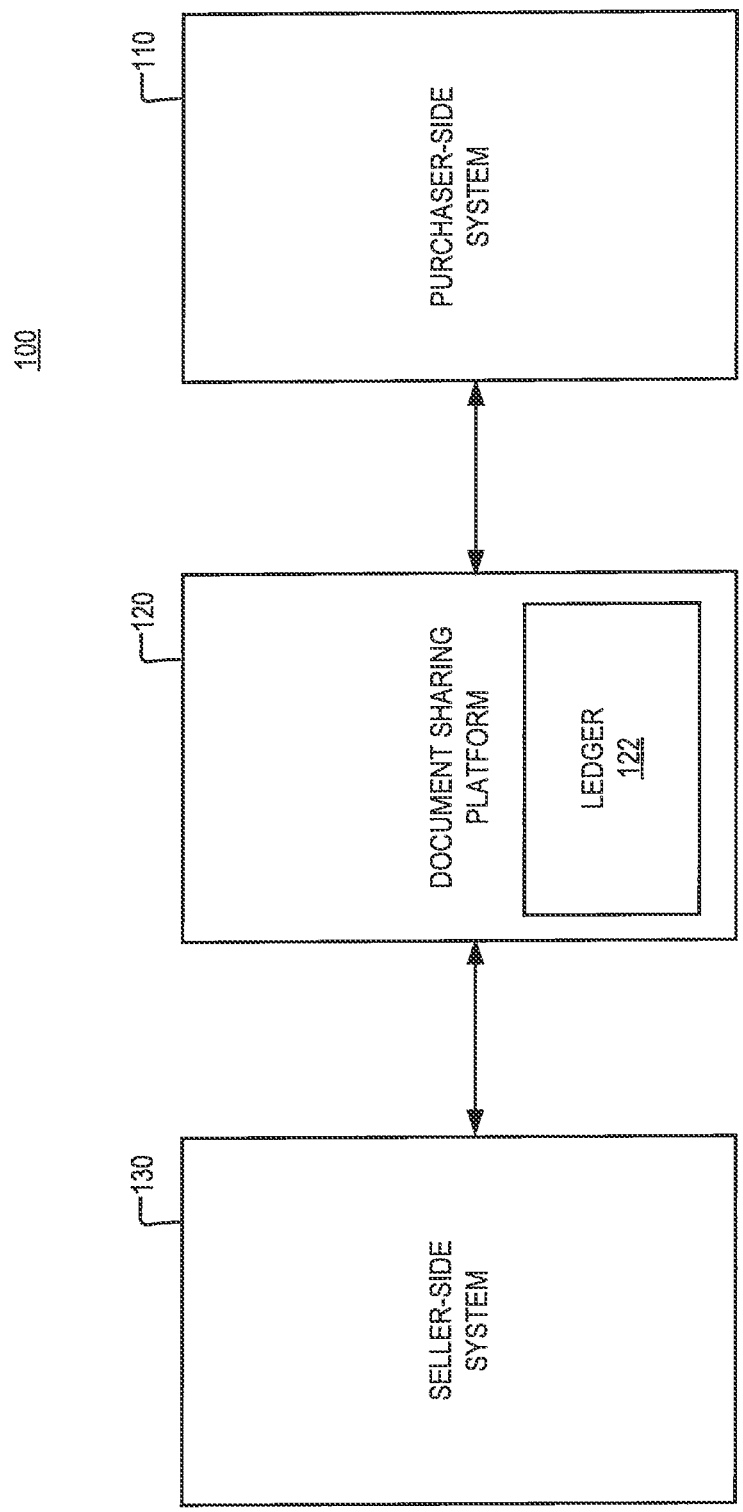
FIG. 1 is a diagram of an example of system, according to aspects of the disclosure.

FIG. 1 is a diagram of an example of a system 100, according to aspects of the disclosure. As illustrated, the system 100 may include a purchaser-side system 110, a document sharing platform 120, and a seller-side system 130. The purchaser-side system 110, the document sharing platform 120, and the seller-side system 130 may be connected to one another via a communications network (not shown). The communications network may include one or more of the Internet, a wide-area network (WAN), a local-area network (LAN), a TCP/IP network, and/or any other suitable type of network.

The system 100 may be configured to execute business-to-business (B2B) transactions. More particularly, the purchaser-side system 110 may be associated with a first person or organization (hereinafter "purchaser") that purchases products from a second person or organization (hereinafter "seller") that is associated with the seller-side system 130. The purchaser-side system 110 may include one or more computing devices configured to place and process orders on behalf of the purchaser. And the seller-side system 130 may include one or more computing devices that are configured to receive and process orders on behalf of the seller. The computing devices in any of the purchaser-side system 110 and seller-side system 130 may be the same or similar to the computing device 600, which is discussed further below with respect to FIG. 6.

The document sharing platform 120 may include any suitable type of cryptographically auditable platform that is configured to provide secure access control. For ease of explanation, the document sharing platform 120 is depicted as being separate from the seller-side system 130 and the purchaser-side system 110. However, according to the present example, the document sharing platform 120 is implemented as a peer-to-peer network including the purchaser-side system 110 and the seller-side system 130. That is, according to the present example, the purchaser-side system 110 is configured to perform the functions of (i) placing and processing orders and (ii) operating as one or more nodes in the document sharing platform 120. Similarly, the seller-side system 130 is configured to perform the functions of (i) receiving and processing orders and (ii) operating as one or more nodes in the document sharing platform 120. Although in the present example the document sharing platform 120 includes only the purchaser-side system 110 and the seller-side system 130, it will be understood that alternative implementations are possible in which the document sharing platform includes third-party nodes. Moreover, it will be understood that other implementations are also possible in which the document sharing platform 120 is implemented separately from the purchaser-side system 110 and the seller-side system 130. Stated succinctly, the present disclosure is not limited to any specific implementations of the document sharing platform 120.

In some implementations, the document sharing platform 120 may include a blockchain platform that is arranged to implement a distributed ledger 122. The blockchain platform may implement a peer-to-peer transaction mechanism that utilizes public-private key cryptography, has no central intermediary or central repository, and allows the purchaser-side system 110 and seller-side system 130 to hold and validate a full copy of the ledger 122. The blockchain platform may be either privately or publicly managed.

The ledger 122 may include a list of records which are linked using a cryptographic technique. In some implementations, the ledger 122 may be configured to store transaction documents corresponding to purchase transactions executed by the purchaser-side system 110 and seller-side system 130. A transaction document stored in a record of the ledger may be updated by generating an "updated" copy of the document and storing the updated copy in a subsequent record in the ledger. Once recorded in the ledger 122, a transaction document cannot be altered retroactively without alteration of all subsequent records, which requires consensus. Storing transaction documents in the ledger 122 may cause the authenticity of the transaction documents to be verifiable by both the purchaser-side system 110 and the seller-side system 130. According to the present example, the consensus on the ledger is validated only by the seller-side system 130. However, alternative implementations are possible in which consensus on the ledger is validated by any node in the document sharing platform 120.

Each of the transaction documents stored in the ledger 122 may include multiple records associated with the same transaction. For instance, a transaction document associated with a given purchase transaction may include a purchase order, one or more invoices associated with the purchase order, one or more remittance records that identify payments for the purchase order, and tracking numbers for one or more shipments associated with the purchase order. This information may be progressively added to the transaction document, by both the purchaser-side system 110 and the seller-side system 130, as the purchase is being fulfilled. For example, the transaction document may be first updated (e.g., to include the purchase order) when the order is placed by the purchaser-side system 110. As another example, the transaction document may be last updated (e.g., to include purchaser shipping data) after delivery is taken for the order by the purchaser-side system 110.

In traditional B2B systems, the purchase order associated with a particular purchase transaction may be stored in a separate record. The invoice associated with the purchase transaction may also be stored in a separate record. The remittance information associated with the purchase transaction may also be stored in a separate record. And any shipping information associated with the purchase may also be stored in a separate record. In other words, traditional B2B systems may store multiple records for the same purchase transaction, whereas, in the system 100, the same information (i.e., the information contained in the records) may be contained in a single transaction document.

In traditional B2B systems, data may be exchanged in messages that are transmitted between the seller and purchaser's systems. For example, the purchase order for a particular transaction may be transmitted in a separate message from the purchaser's system to the seller's system. As another example, the invoice for the same transaction may be transmitted in a separate message from the seller's system to the purchaser's system. Both examples are in contrast to the system 100, in which the same data can be written in the same transaction document, which is shared between the purchaser-side system 110 and the seller-side system 130 (via the document sharing platform 120).

The model adopted by some traditional B2B systems may require frequent reconciliation of transaction records that are generated by the participants in a purchase transaction. For example, each communication from a purchaser may carry a first serial number for a purchase that is assigned by the purchaser's system and a purchaser part number for the product that is being purchased. On the seller's side, however, records for the purchase may be maintained under a second serial number for the purchase that is assigned by the seller's system and a seller part number for the product that is being purchased. Each message received by the seller, from the purchaser, may carry the purchaser's serial number and/or the purchaser's part number, which requires the seller to execute a reconciliation process that involves matching the purchaser's serial number to records, stored in the seller's system, that carry the seller's serial number.

The system 100 may be advantageous over traditional B2B systems because it reduces the need for reconciliation of information generated by the participants in a purchase transaction. Because, in the system 100, records generated for a particular purchase transaction by the purchaser-side system 110 and the seller-side system 130 are written to the same transaction document, no subsequent action is necessary to reconcile the records. The approach offered by the system 100 may advantageous over that of the traditional B2B systems because it simplifies and reduces the cost associated with maintaining purchase transaction records.

Figure 2:
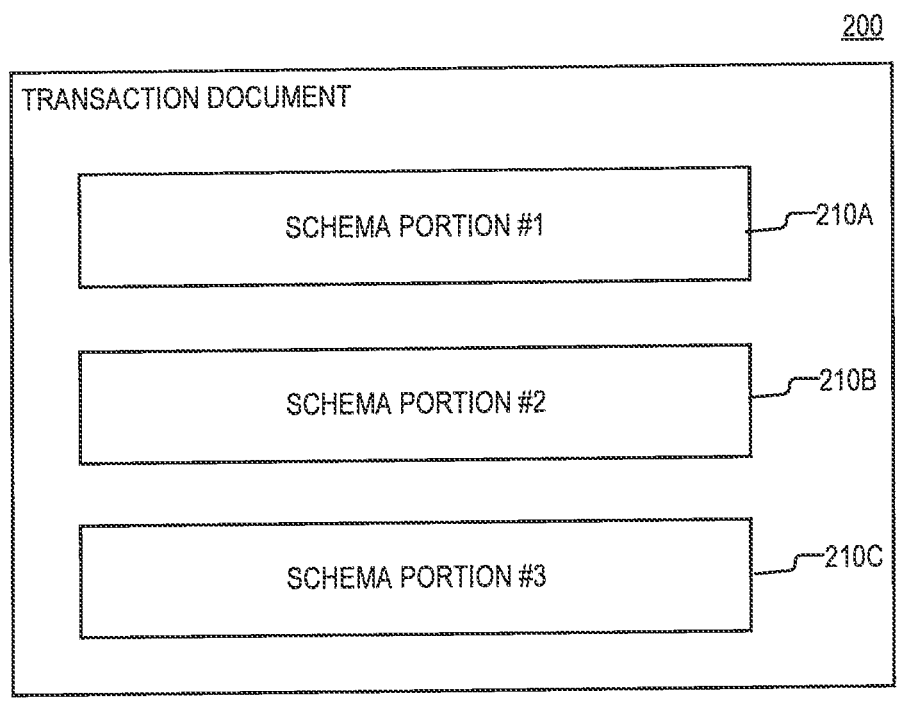
FIG. 2 is a diagram of an example of a transaction document, according to aspects of the disclosure.

FIG. 2 is a diagram of an example of a transaction document 200 that is stored in the ledger 122, according to aspects of the disclosure. As noted above, the transaction document 200 may be a progressively updated document that is associated with a particular purchase order, and which is enriched over time as the order is being fulfilled. In some implementations, the transaction document 200 may correspond to only one purchase order. Moreover, in some implementations, the transaction document 200 may include a plurality of portions 210, wherein each portion corresponds to a different part of the purchase order. For example, a purchase order may be for 10 laptops, 5 desktops, and 1 printer. In such instances, the portion 210A may include information relating to the purchase of the 10 laptops, the portion 210B may contain information relating to the purchase of the 5 desktops, and the portion 210C may include information relating to the purchase of the printer. Although in the present example information relating to different products is stored in different portions 210, it will be understood that alternative implementations in which the information relating to all (or at least multiple) products is stored in the same portion 210. In some implementations, each portion 210 (or the entire transaction document 200) may have a format which is described further below with respect to FIG. 3.

Figure 3:
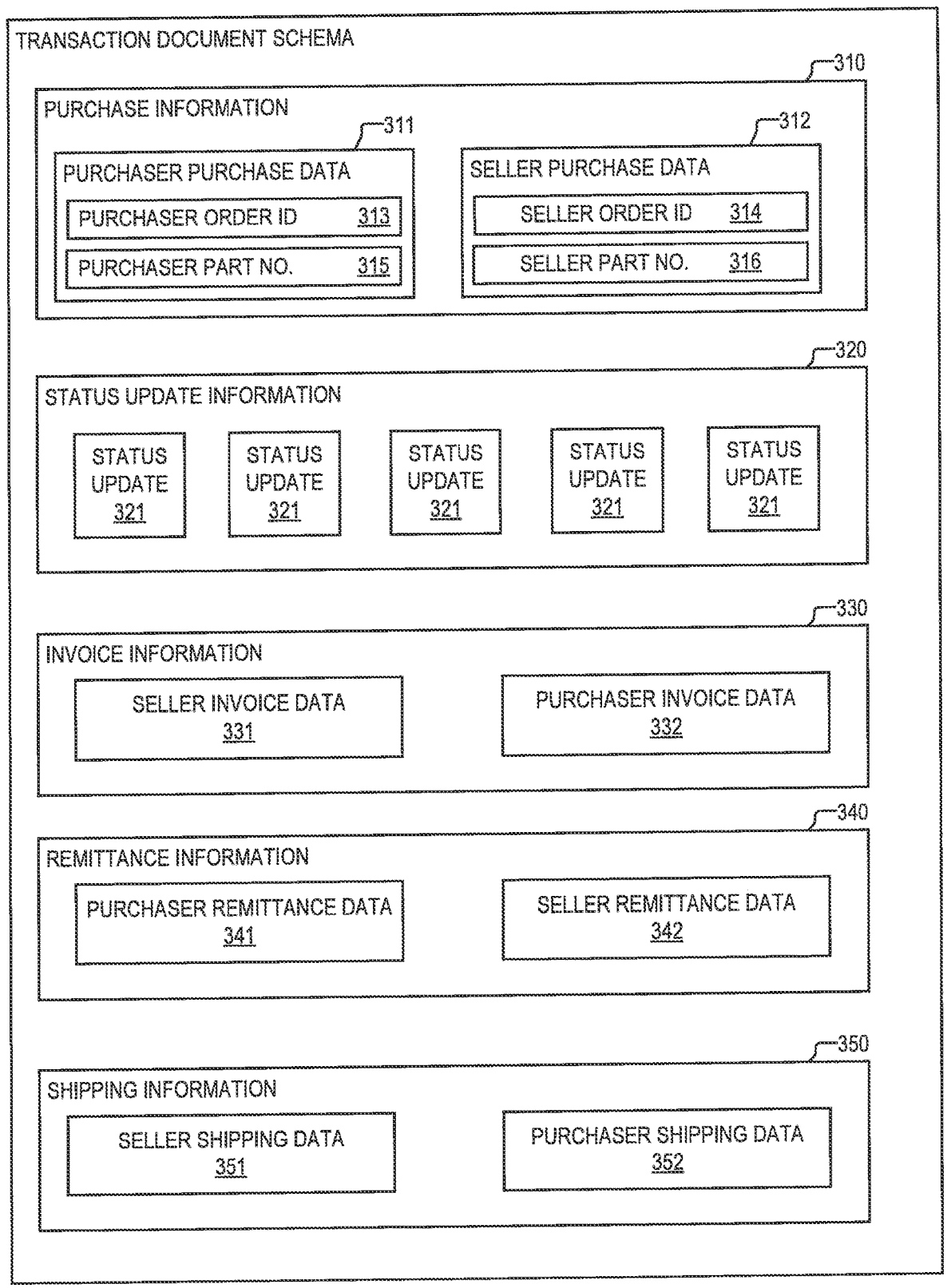
FIG. 3 is a diagram of an example of a transaction document schema, according to aspects of the disclosure.

FIG. 3 is a diagram illustrating an example of a schema 300, according to aspects of the disclosure. As noted above, the schema 300 may define the format of the entire transaction document 200 or one of the portions 210. As illustrated, the schema 300 may include a purchase information section 310, a status information section 320, an invoice information section 330, a remittance information section 340, and a shipping information section 350.

Section 310 may include purchaser purchase data 311 and seller purchase data 312. The purchase data 311 may include a purchase order that is placed by the purchaser, and as such, it may include any suitable type of data that is normally found in purchase orders. For example, the purchase data 311 may identify one or more products that are desired to be purchased, the desired quantity of each product, shipping address where the products are desired to be delivered, and so forth. In some implementations, the purchase data 311 may include a purchase order ID 313 and a respective purchaser part number 315 for each of the products that are desired to be purchased. The purchase order ID 313 may be a serial number that is assigned to the purchase by the purchaser-side system 110. The respective purchaser part number 315 for each of the desired products may be a part number under which the product is recognized in the purchaser-side system 110. The purchase data 312 may include one or more records associated with the purchase that are generated by the seller-side system 130. In some implementations, the purchase data 312 may include a seller order ID 314 and a respective seller part number 316 for each of the desired products. The seller order ID may include a serial number assigned to the purchase by the seller-side system 130. The respective seller part number 316 for each of the desired products may be a part number under which the product is recognized in the seller-side system 130.

Section 320 may include one or more status updates 321 pertaining to the purchase order identified in section 310. Each of the status updates 321 may comprise text identifying the status of the order at a given time instant. In some implementations, any of the status updates 321 may report on a manufacturing delay associated with the order (or portion thereof). Additionally or alternatively, in some implementations, any of the status updates 321 may indicate that the order is being delayed pending a credit check of the purchaser's account. The present disclosure is not limited to any specific type of information being provided in the status updates 321.

Section 330 may include seller invoice data 331 and purchaser invoice data 332. The invoice data 331 may include one or more invoices generated by the seller-side system 130 for the purchase order. As such, the invoice data 331 may include any suitable type of information which is normally included in commercial invoices, such as an identification of the products that are being purchased, the agreed price for the products, the agreed quantity of each product, and so forth. The invoice data 332 may include any suitable type of information that is normally generated by a purchaser in connection with received invoices. For example, in some implementations, the invoice data 332 may include a respective identifier (e.g., a serial number) accorded by the purchaser-side system 110 for each invoice that is received by the seller-side system 130, an indication of whether any of the received invoices has been paid, an indication of the date of the payment of any of the received invoices, an indication of the date of receipt of any of the received invoices, etc.

Section 340 may include purchaser remittance data 341 and seller remittance data 342. The remittance data 341 may identify one or more payments for the purchase that are made by the purchaser. As such, the purchaser remittance data 341 may identify one or more of: the date on which one or more payments are made, the respective identifier (e.g., serial number) accorded by the purchaser-side system 110 to any of the payments, the respective amount of any of the payments, the bank account to which any of the payments was made, the bank account from which any of the payments was made, the currency in which any of the payments was made, an identifier corresponding to an invoice associated with any of the payments, an identifier under which any of the payments is entered in the purchaser's accounting systems and/or any other suitable type of information. The remittance data 342 may include any suitable type of information that is normally generated by a seller in connection with received remittance records (or in connection with a received payment). For example, the remittance data 342 may identify the date in which one or more payments are received by the seller and an identifier (e.g., serial number) under which the payment is entered in the seller's accounting systems. Additionally or alternatively, in some implementations, the remittance data 342 may include one or more payment receipts.

Section 350 may include seller shipping data 351 and purchaser shipping data 352. The shipping data 351 may include one or more shipping notifications for products associated with the purchase. In some implementations, the shipping data 351 may identify one or more of: time when one or more shipments associated with the order were made, the expected delivery of any of the shipments, a respective tracking number for any of the shipments, a respective weight of any packages that are shipped, a respective carrier used for any of the shipments, etc. The shipping data 352 may include any suitable information generated by purchases in connection with received shipments. For each of the shipments, the shipping data 352 may identify: whether the shipment was received, a warehouse where the shipment was received, the name of an employee who accepted the shipment, and/or any other suitable type of information. Additionally or alternatively, in some implementations, shipping data may include one or more proofs of delivery that are generated by the purchaser-side system 110.

Although in the example of FIG. 3, each of the sections 310-350 is separate from the remaining sections 310-350, it will be understood that alternative implementations are possible in which the data in each of the sections 310-350 is interleaved (e.g., mixed) with the data in any of the remaining sections 310-350. Although in the example of FIG. 3 each of the sections 310-350 includes both purchaser data and seller data, it will be understood that alternative implementations are possible in which any of the sections 310-350 includes only purchaser data or only seller data. For example, in some implementations, section 330 may include only seller invoice data. As another example, in some implementations, section 340 may include only purchaser remittance data. Stated succinctly, the present disclosure is not limited to any specific implementation of the schema 300.

Figure 4:
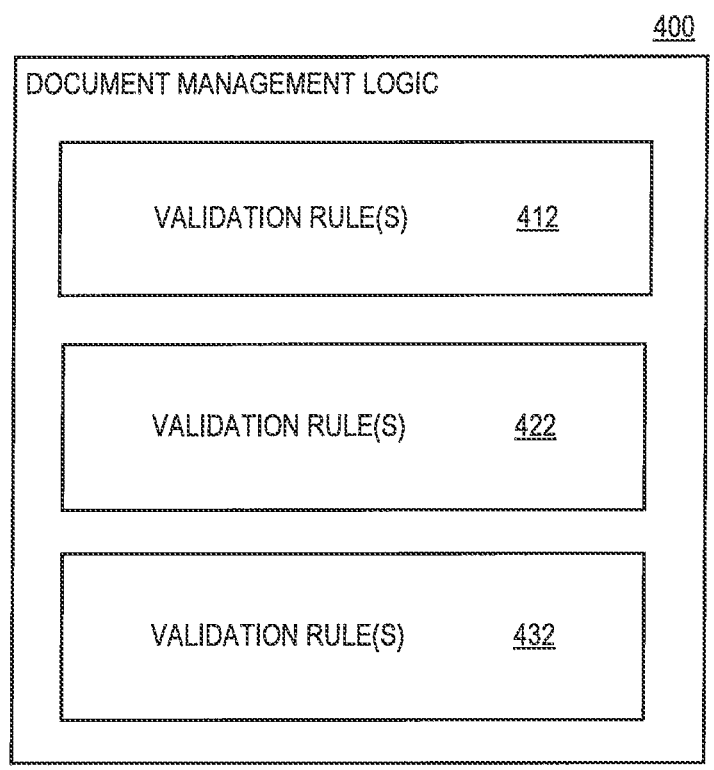
FIG. 4 is a diagram of an example of a document management logic, according to aspects of the disclosure.
Figure 5A:
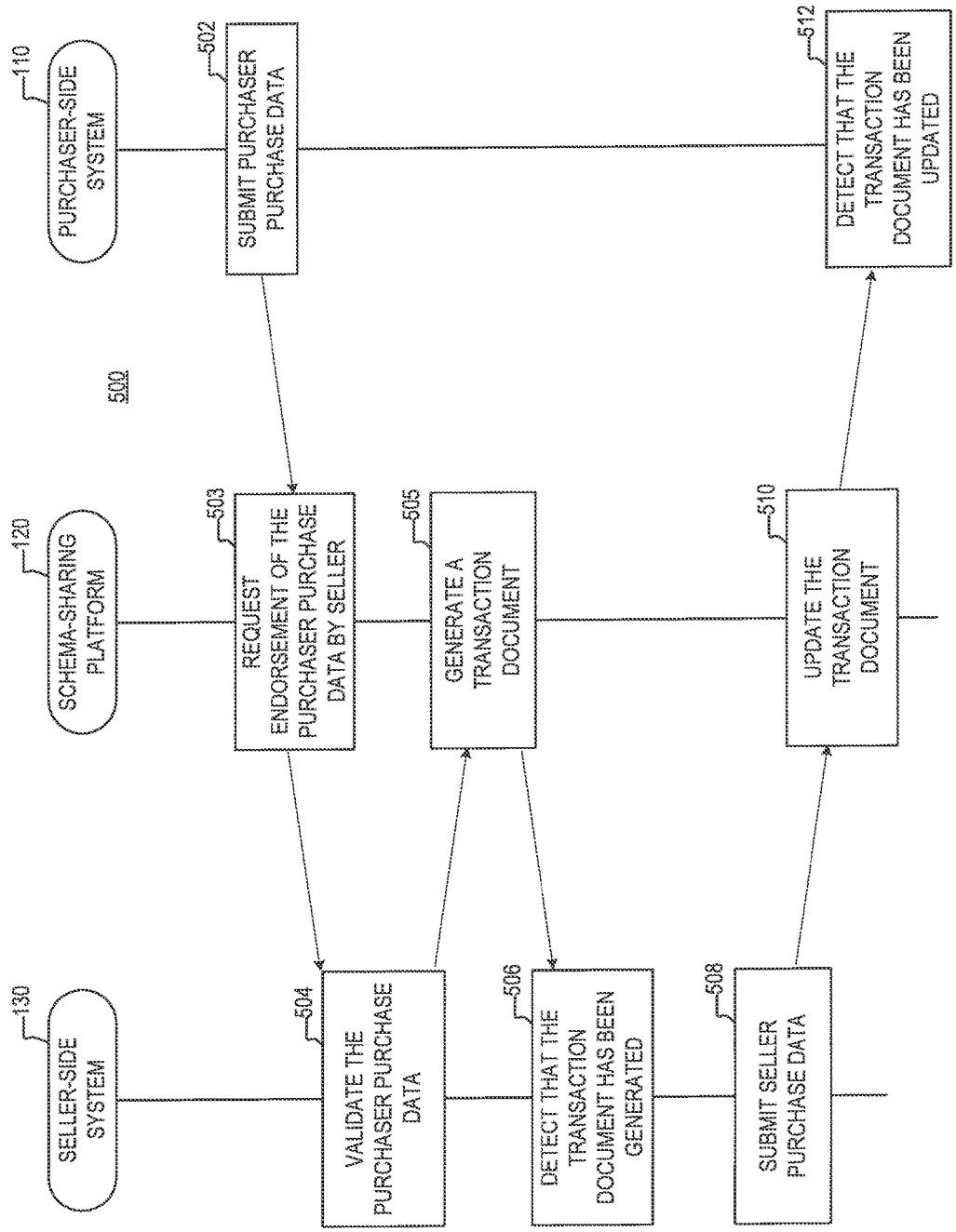
FIG. 5A is a sequence diagram of an example of a process, according to aspects of the disclosure.
Figure 5B:
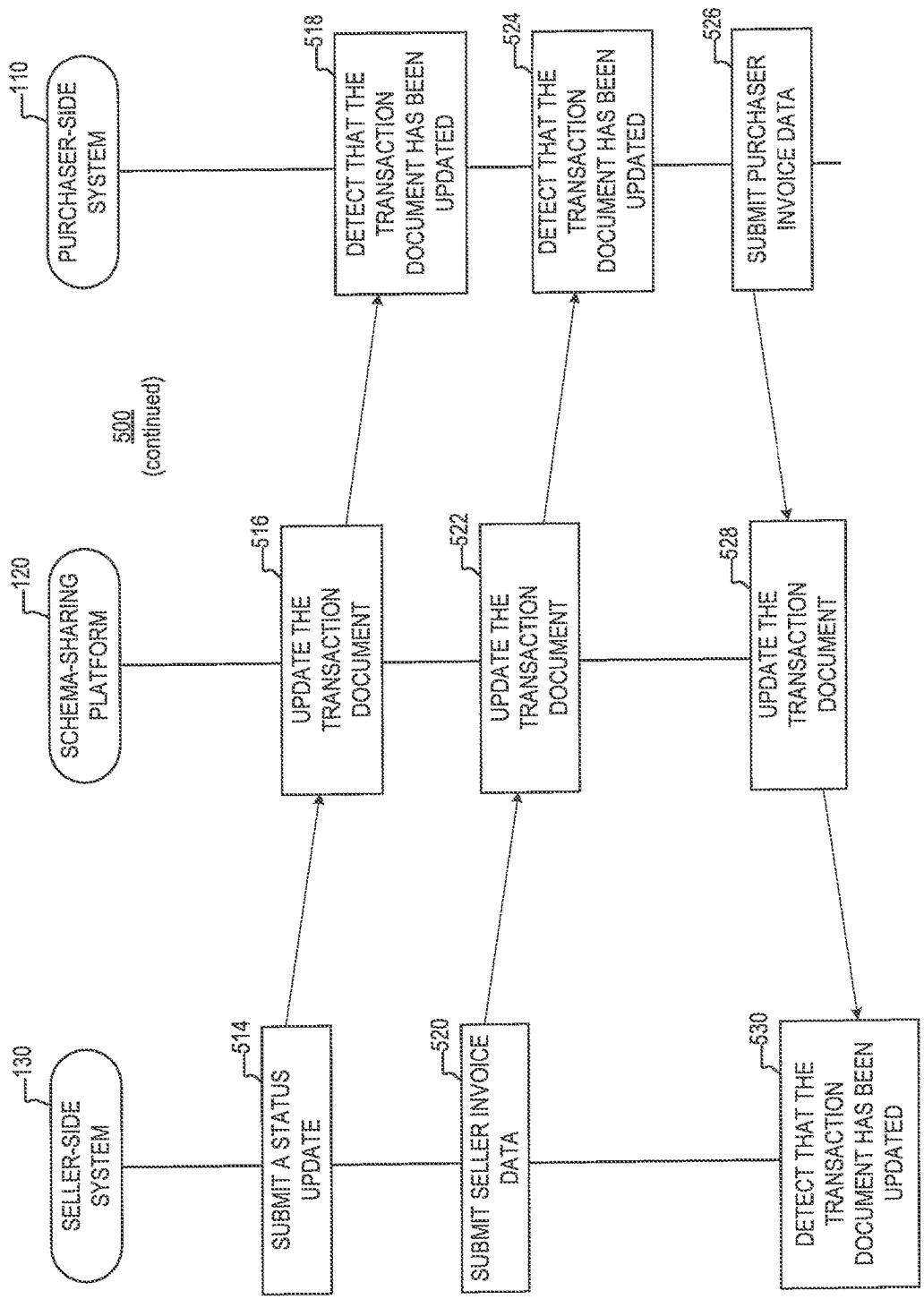
FIG. 5B is a sequence diagram of an example of a process, according to aspects of the disclosure.
Figure 5C:
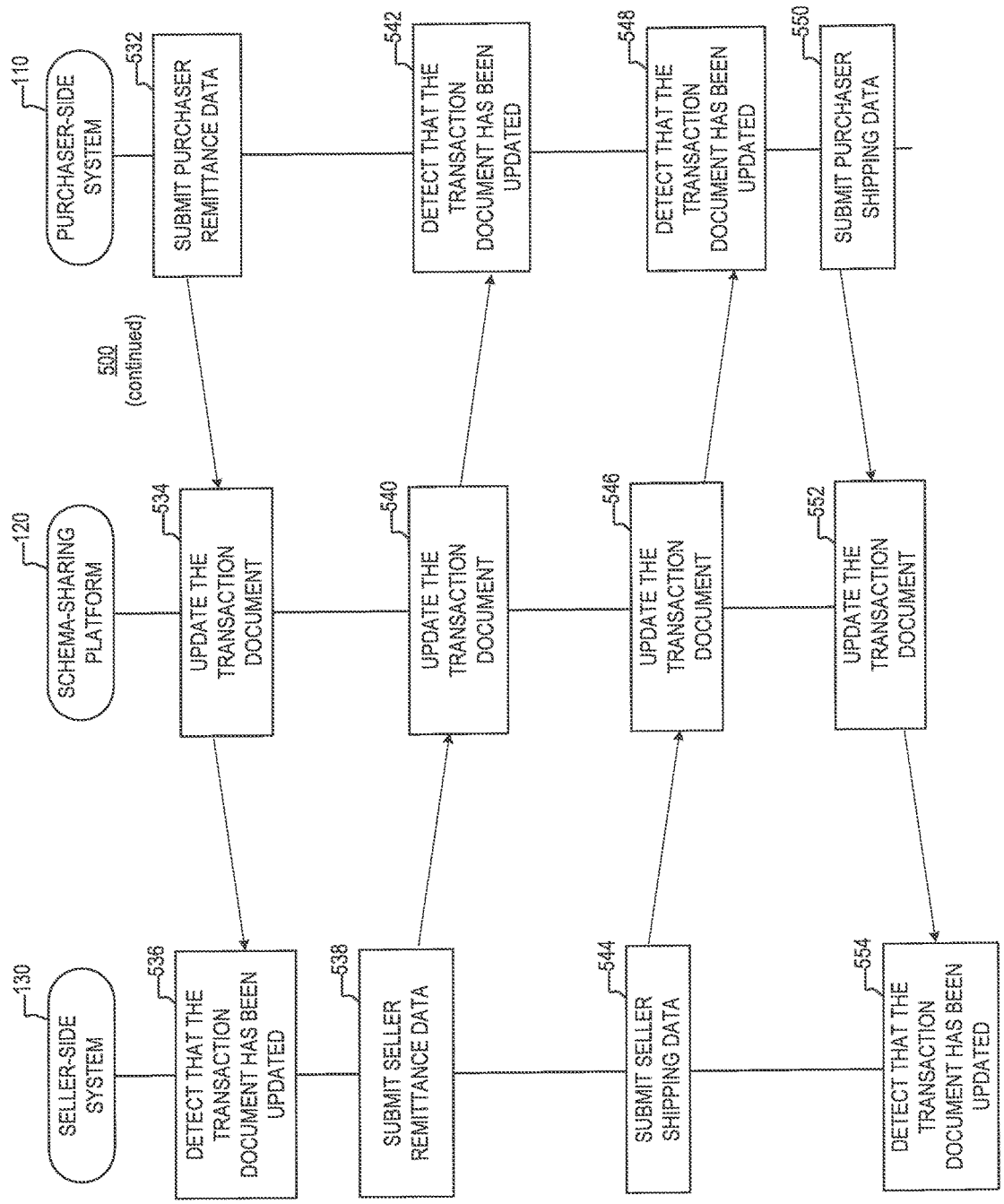
FIG. 5C is a sequence diagram of an example of a process, according to aspects of the disclosure.

FIG. 4 is a diagram of an example of a document management logic 400 which is executed by the seller-side system 130 for the purposes of generating the transaction document 200 and/or validating updates to the transaction document 200 that are made by the purchaser-side system 110 and/or the seller-side system 130. The document management logic 400 may include one or more processor-executable instructions which when executed by at least one processor of the document sharing platform 120 cause the document sharing platform 120 to generate and/or update transaction documents that are stored in the ledger 122. As is further discussed below, in some implementations, the document management logic 400 may be executed when the document sharing platform 120 receives a new purchase order, when the document sharing platform 120 receives a request to add new data to a transaction document, or when the document sharing platform 120 receives a request to change the value of data that has already been entered into the transaction document.

The document management logic 400 may include one or more validation rules 412 that specify conditions under which a new transaction document can be created. Any of the validation rules 412 may specify one or more terms under which a product is offered for sale. When a purchase order is placed by the purchaser-side system 110, the seller-side system 130 may be configured to execute the document management logic 400 and evaluate whether the purchase order complies with the validation rules 412. If the purchase order complies with the validation rules 412, a new transaction document may be generated and stored in the ledger 122. Otherwise, if the purchase order does not comply with the validation rules 412, the document management logic 400 may refuse to validate the purchase order, causing the purchase order to be declined. For example, in some implementations, any of the validation rules 412 may specify that no orders shall be fulfilled that are worth less than 500 dollars. In such instances, any orders for less than this amount may be automatically declined when the document management logic 400 is executed in response to document sharing platform 120 receiving a new purchase order for less than $500 from the purchaser-side system 110.

The document management logic 400 may further include one or more validation rules 422 that specify conditions under which new data can be entered into an existing transaction document. When one of the purchaser-side system 110 and the seller-side system 130 attempts to add new data to an existing transaction document, the document management logic 400 and evaluate whether the new data complies with the validation rules 422. If the new data does not comply with the validation rules 422, the document management logic 400 may refuse to validate the new data, and the new data will not be entered into the transaction document as a result. Otherwise, if the new data complies with the validation rules 422, the document management logic 400 may successfully validate the new data, and the new data will be entered into the transaction document as a result.

The document management logic 400 may further define one or more validation rules 432 that specify conditions for correcting data that has already been entered in a transaction document. When one of the purchaser-side system 110 and the seller-side system 130 attempts to correct data that has already been entered in the transaction document, the document management logic 400 and evaluate whether the correction complies with the validation rules 432. If the correction does not comply with the request, the document management logic 400 may refuse to validate the correction, and the correction will not be entered into the transaction document. Otherwise, if the request complies with the validation rules 432, the document management logic 400 may successfully validate the correction, and the correction will be entered into the transaction document, as a result.

The present disclosure is not limited to any specific implementation of the validation rules 432. By way of example, any of the validation rules 432 may specify temporal constraints on updating specific types of data. More particularly, any of the validation rules 433 may specify that changes in the quantity of a product that is being ordered can be made only within 72 hours of the placement of the original order. When the purchaser-side system 110 requests to change the requested quantity of a particular product that is listed in a transaction document, the seller-side system 130 may execute the document management logic 400 to determine whether the request is received within 72 hours from the placement of the initial purchase order. If the request is received within the prescribed 72-hour period, the seller-side system 130 may allow the document sharing platform 120 to replace a current product quantity that is listed in the transaction document with a new product quantity that is specified by the request. If the request is received outside of the prescribed 72-hour period, the seller-side system 130 may refuse to provide permission to the document sharing platform 120 to enter the correction. FIGS. 5A-D show a sequence diagram of an example of a process 500 for generating and updating transaction documents, according to aspects of the disclosure.

At step 502, the purchaser-side system 110 initiates the transaction document associated with a purchase order by providing purchase data associated with the order to the document sharing platform 120. In some implementations, the purchase data may be the same or similar to the purchaser purchase data 311, which is discussed above with respect to FIG. 3. At step 503, in response to receiving the purchase order, the document sharing platform 120 requests the seller-side system 130 to validate the purchase data that is provided by the purchaser-side system 110. At step 504, the seller-side system 130 executes the logic 400, and successfully validates the purchase data as a result. After the purchase data is successfully validated, the document sharing platform 120 is notified by the seller-side system 130 that that the purchase data has been successfully validated. At step 505, in response to being notified that the purchase data is successfully validated, the document sharing platform 120 generates the transaction document 200. In some implementations, generating the transaction document 200 may include instantiating a new transaction document, inserting purchase order information contained in the purchase order request into the newly-instantiated transaction document, and recording the newly instantiated transaction document in the ledger 122. At step 506, the seller-side system 130 detects that a transaction document corresponding to a new purchase order has been generated and recorded in the ledger 122. Although in the present example the purchase data is successfully validated, alternative implementations are possible in which the logic 400 refuses to validate the purchase data. In such instances, the seller-side system may notify the document sharing platform 120 that the purchase data cannot be validated, and the document sharing platform 120 may decline to generate a new transaction document for the purchase order.

At step 508, the seller-side system 130 initiates an update of the transaction document 200 with seller purchase data by submitting the seller purchase data to the document sharing platform 120. In some implementations, the seller purchase data may be the same or similar to the seller purchase data 312. At step 510, the document sharing platform 120 updates the transaction document 200 to include the information contained in the initial response. As noted above, updating the transaction document 200 may include retrieving the most recent version of the transaction document 200 from the ledger 122, generating a new version of the transaction document 200 by inserting the information contained in the initial response into the retrieved version, and recording the new version of the transaction document 200 in the ledger 122. At step 512, the purchaser-side system 110 detects that the transaction document has been updated.

At step 514, the seller-side system 130 initiates an update of the transaction document 200 with status update information by submitting the status update information to the document sharing platform 120. The status update may be the same or similar to any of the status updates 321, which are discussed above with respect to FIG. 3. At step 516, the document sharing platform 120 updates the transaction document 200 to include the status update. As noted above, updating the transaction document 200 may include retrieving the most recent version of the transaction document 200 from the ledger 122, generating a new version of the transaction document 200 by inserting the status update into the retrieved version, and recording the new version of the transaction document 200 into the ledger 122. At step 518, the purchaser-side system 110 detects that a new status update has been recorded in the status document.

At step 520, the seller-side system 130 initiates an update of the transaction document 200 with new invoice data by submitting the new invoice data to the document sharing platform 120. The invoice data may be the same or similar to the seller invoice data 331, which is discussed above with respect to FIG. 3. At step 522, the document sharing platform 120 updates the transaction document 200 to include the new invoice data. As noted above, updating the transaction document 200 may include retrieving the most recent version of the transaction document 200 from the ledger 122, generating a new version of the transaction document 200 by inserting the invoice data into the retrieved version, and recording the new version of the transaction document 200 in the ledger 122. At step 524, the purchaser-side system 110 detects that the transaction document 200 has been updated to include new invoice data that is supplied by the seller-side system 130.

At step 526, the purchaser-side system 110 initiates an update of the transaction document 200 with new invoice data by submitting the new invoice data to the document sharing platform 120. The invoice data may be the same or similar to the purchaser invoice data 332, which is discussed above with respect to FIG. 3. At step 528, the document sharing platform 120 updates the transaction document 200 to include the new invoice data. As noted above, updating the transaction document 200 may include retrieving the most recent version of the transaction document 200 from the ledger 122, generating a new version of the transaction document 200 by inserting the invoice data into the retrieved version, and recording the new version of the transaction document 200 in the ledger 122. At step 530, the seller-side system 130 detects that the transaction document 200 has been updated to include new invoice data supplied by the purchaser-side system 110.

At step 532, the purchaser-side system 110 initiates an update of the transaction document with new remittance data by submitting the remittance data to the document sharing platform 120. The remittance data may be the same or similar to the remittance data 341, which is discussed above with respect to FIG. 3. At step 534, the document sharing platform 120 updates the transaction document 200 to include the new remittance data. As noted above, updating the transaction document 200 may include retrieving the most recent version of the transaction document 200 from the ledger 122, generating a new version of the transaction document 200 by inserting the new remittance data into the retrieved version, and recording the new version of the transaction document 200 in the ledger 122. At step 536, the seller-side system 130 detects that the transaction document 200 has been updated to include new remittance data that is supplied by the purchaser-side system 110.

At step 538, the seller-side system 130 initiates an update of the transaction document 200 with new remittance data. The new remittance data may be the same or similar to the seller remittance data 342, which is discussed above with respect to FIG. 3. At step 540, the document sharing platform 120 updates the transaction document 200 to include the new remittance data. As noted above, updating the transaction document 200 may include retrieving the most recent version of the transaction document 200 from the ledger 122, generating a new version of the transaction document 200 by inserting the new remittance data into the retrieved version, and recording the new version of the transaction document 200 in the ledger 122. At step 542, the purchaser-side system 110 detects that the transaction document 200 has been updated to include new remittance data that is supplied by the seller-side system 130.

At step 544, the seller-side system 130 initiates an update of the transaction document 200 with new shipping data by submitting the shipping data to the document sharing platform 120. The new shipping data may be the same or similar to the seller shipping data 351, which is discussed above with respect to FIG. 3. At step 546, the document sharing platform 120 updates the transaction document 200 to include the new shipping data. As noted above, updating the transaction document 200 may include retrieving the most recent version of the transaction document 200 from the ledger 122, generating a new version of the transaction document 200 by inserting the new shipping data into the retrieved version, and recording the new version of the transaction document 200 in the ledger 122. At step 548, the purchaser-side system 110 detects that the transaction document 200 has been updated to include new shipping data that is supplied by the seller-side system 130.

At step 550, the purchaser-side system 110 initiates an update of the transaction document 200 with new shipping data by submitting the shipping data to the document sharing platform 120. The new shipping data may be the same or similar to the purchaser shipping data 352, which is discussed above with respect to FIG. 3. At step 552, the document sharing platform 120 updates the transaction document 200 to include the new shipping data. As noted above, updating the transaction document 200 may include retrieving the most recent version of the transaction document 200 from the ledger 122, generating a new version of the transaction document 200 by inserting the new shipping data into the retrieved version, and recording the new version of the transaction document 200 in the ledger 122. At step 554, the seller-side system 130 detects that the transaction document 200 has been updated to include new shipping data that is supplied by the purchaser-side system 110.

At step 556, the seller-side system 130 initiates a correction to the value of data that has already been entered into the transaction document 200 by submitting a new value for the data to the document sharing platform 120. At step 558, in response to receiving the request, the document sharing platform 120 updates the transaction document 200 to correct the value of the data that has already been entered into the transaction document. As noted above, updating the transaction document 200 may include retrieving the most recent version of the transaction document 200 from the ledger 122, generating a new version of the transaction document 200 by replacing a current value of the data item with the new value, and recording the new version of the transaction document 200 in the ledger 122. At step 560, the purchaser-side system 110 detects that a correction has been made to the transaction document 200 by the seller-side system 130.

At step 562, the purchaser-side system initiates a correction to the value of a data item that has already been entered into the transaction document 200 by submitting to the sharing platform 120 a new value for the data item (e.g., product quantity). At step 564, the document sharing platform 120 requests the seller-side system 130 to provide an endorsement of the correction. At step 566, the seller-side system 130 validates the correction by executing the logic 400 and notifies the document sharing platform 120 that the correction has been successfully validated. At step 568, the sharing platform updates the transaction document 200 to correct the value of the data item that has already been entered into the transaction document. As noted above, updating the transaction document 200 may include retrieving the most recent version of the transaction document 200 from the ledger 122, generating a new version of the transaction document 200 by replacing a current value of the data item with the new value, and recording the new version of the transaction document 200 in the ledger 122.

According to aspects of the disclosure, the example of FIGS. 5A-D follows a pattern in which the seller-side system 130 initiates an update of the transaction document 120 with new data by submitting the new data to the document sharing platform 120, after which the transaction document 200 is updated to include the new data by the document sharing platform 120. According to the present example, initiating the update may include executing order processing logic on the seller-side system 130, which when executed by the seller-side system 130 causes the seller-side system to (1) generate the new data and (2) provide the new data to a sharing platform logic that is associated with the document sharing platform 120. As noted above, in some implementations, the sharing platform logic may be executed on the seller-side system 130 and it may implement the function(s) performed by one or more nodes of the document sharing platform 120 (e.g., blockchain nodes). As noted above, executing the sharing platform logic may cause the seller-side system 130 to: (i) receive new data provided by the order processing logic, (ii) generate a new version of the transaction document 200 and (iii) record the new version of the transaction document on the ledger 122. Although in the present example each of the order processing logic and the sharing platform logic is implemented in software, it will be understood that alternative implementations are possible in which any of the order processing logic and the sharing platform logic is implemented in hardware or as a combination of software and hardware.

According to aspects of the disclosure, the example of FIGS. 5A-D follows a pattern in which the purchaser-side system 110 initiates an update of the transaction document 120 with new data by submitting the new data to the document sharing platform 120, after which the transaction document 200 is updated to include the new data by the document sharing platform 120. According to the present example, initiating the update may include executing order processing logic on the purchaser-side system 110, which when executed by the purchaser-side system 110 causes the purchaser-side system 110 to (1) generate the new data and (2) provide the new data to a sharing platform logic that is associated with the document sharing platform 120. As noted above, in some implementations, the sharing platform logic may be executed on the purchaser-side system 110 and it may implement the function(s) performed by one or more nodes of the document sharing platform 120 (e.g., blockchain nodes). As noted above, executing the sharing platform logic may cause the purchaser-side system 110 to: (i) receive new data provided by the order processing logic, (ii) generate a new version of the transaction document 200 and (iii) record the new version of the transaction document on the ledger 122. Although in the present example each of the order processing logic and the sharing platform logic is implemented in software, it will be understood that alternative implementations are possible in which any of the order processing logic and the sharing platform logic is implemented in hardware or as a combination of software and hardware.

In some implementations, any update to the transaction document 200, which is initiated by one of the purchaser-side system 110 and the seller-side system 130, may be validated by the document management logic 400 before it is entered into the transaction document. In some implementations, upon receiving new data from the purchaser-side system 110, which is requested to be added to the transaction document 200, the document sharing platform 120 may request the seller-side system 130 to validate the new data. In response, the seller-side system 130 may execute the logic 400 and validate the new data. When the data is successfully validated, the seller-side system 130 may notify the document sharing platform 120 that the data has been validated, and the document sharing platform 120 may add the new data to the transaction document 200, in response. When the data is not successfully validated, the seller-side system 130 may notify the document sharing platform 120 that the data cannot be validated, and the document sharing platform 120 may decline to add the new data to the transaction document 200. Furthermore, in some implementations, any data that is entered into the transaction document 200 by the seller-side system 130 may be validated by the logic 400, before it is entered into the transaction document 200.

According to aspects of the disclosure, the example of FIGS. 5A-D follows a pattern in which one of the purchaser-side systems 110 and the seller-side system 130 makes changes to the transaction document 200, and the other one of the purchaser-side system 110 and seller-side system 130 detects the changes. According to aspects of the disclosure, changes to the transaction document may be detected by any of the purchaser-side system 110 and seller-side system 130 by periodically polling the document sharing platform 120 to determine whether the transaction document 200 has been changed (e.g., by the addition of new data or the correction of previously-entered data). Additionally, or alternatively, in some implementations, changes to the transaction document may be detected based on an update notification received from the document sharing platform 120 which indicates that the transaction document has been changed. In such implementations, the document sharing platform 120 may be configured to provide a notification to the seller-side system 130 every time the transaction document 200 has been updated by the purchaser-side system 110 to include new data (or replace existing data); similarly, the document sharing platform 120 may be configured to provide a notification to the purchaser-side system 110 every time the transaction document 200 has been updated by the seller-side system 130 to include new data (or replace existing data).

According to aspects of the disclosure, when a system (e.g., one of the purchaser-side system 110 and seller-side system 130) detects that the transaction document 200 is updated, the system may output a notification that the transaction document has been updated. In some implementations, outputting the notification may include displaying the notification on a display screen or transmitting the notification over a communications network to a user terminal. Once the notification is presented to a user, the user may retrieve the transaction document 200 from the document sharing platform 120 to examine any changes that have been made to the transaction document 200.

FIG. 6 is a diagram of an example of a computing device 600, according to aspects of the disclosure. Computing device 600 may include processor 602, volatile memory 604 (e.g., RAM), non-volatile memory 606 (e.g., a hard disk drive, a solid state drive such as a flash drive, a hybrid magnetic and solid state drive, etc.), graphical user interface (GUI) 609 (e.g., a touchscreen, a display, and so forth) and input/output (I/O) device 620 (e.g., a mouse, a keyboard, etc.). Non-volatile memory 606 stores computer instructions 612, an operating system 616 and data 618 such that, for example, the computer instructions 612 are executed by the processor 602 out of volatile memory 604 to perform at least a portion of 600-900. Program code may be applied to data entered using an input device of GUI 609 or received from I/O device 620.

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used throughout the disclosure, the term product may include a physical object that is being bought and sold, a service, and/or anything else that can be purchased and solved. Although in the example of FIGS. 1-6, the transaction document 200 is used to store records relating to a purchase transaction, the present disclosure is not limited to any specific content being stored in the transaction document 200. In this regard, it will be understood that alternative implementations are possible in which the transaction document 200 is used to manage other types of transaction, instead of purchase transactions.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms, do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method for recording purchase transactions, comprising:
    receiving, at a blockchain platform, a purchase order, the purchase order being associated with purchase information that identifies a product, a product quantity, and a first order identifier that is assigned to the purchase order by a purchaser-side system, the purchase order being received from the purchaser-side system, the purchaser-side system being configured to implement one or more nodes of the blockchain platform, the purchaser-side system being further configured to place and process orders on behalf of a purchaser;
    transmitting, by the blockchain platform, a request to validate the purchase order, the request being transmitted to a seller-side system, the seller-side system being configured to implement one or more nodes of the blockchain platform, the seller-side system being further configured to receive and process orders on behalf of a seller;
    instantiating, by the blockchain platform, a transaction document in response to receiving an indication from the seller-side system that the purchase order is successfully validated, including the purchase information into the transaction document, and recording the transaction document in a cryptographically protected ledger of the blockchain platform; and
    progressively updating the transaction document with information provided by the purchaser-side system and the seller-side system as the purchase order is being fulfilled, wherein each update to the transaction document is recorded in the cryptographically protected ledger,
    wherein the transaction document is dedicated to storing information related to only one purchase order, and
    wherein updating the transaction document includes inserting an invoice associated with the purchase order into the transaction document, inserting seller remittance data that is associated with a payment corresponding to the invoice into the transaction document, inserting purchaser remittance data that is associated with the payment into the transaction document, and inserting one or more status updates into the transaction document.

2. The method of claim 1, wherein progressively updating the transaction document includes:
    receiving from the purchaser-side system a new value for a data item that has already been entered into the transaction document,
    generating a new version of the transaction document by replacing a current value of the data item with the new value, and
    recording the new version of the transaction document into the cryptographically protected ledger.

3. The method of claim 1, wherein progressively updating the transaction document includes:
    receiving from the purchaser-side system a new value for a data item that has already been entered into the transaction document,
    detecting whether a condition for updating the data item is satisfied,
    generating a new version of the transaction document by replacing a current value of the data item with the new value, the current value of the data item being replaced with the new value only when the condition is satisfied, and
    recording the new version of the transaction document into the cryptographically protected ledger.

4. The method of claim 1, wherein the transaction document includes an identifier corresponding to at least one shipment that is associated with the purchase order.

5. The method of claim 1, wherein the purchaser remittance data includes a serial number accorded to the payment by the purchaser-side system.

6. A system that is part of a blockchain platform, the system comprising:
    a memory; and
    at least one processor operatively coupled to the memory, the at least one processor being configured to perform the operations of:
    receiving from a purchaser-side system, a purchase order, the purchase order being associated with purchase information that identifies a product, a product quantity, and a first order identifier that is assigned to the purchase order by the purchaser-side system, the purchaser-side system being configured to implement one or more nodes of the blockchain platform, the purchaser-side system being further configured to place and process orders on behalf of a purchaser;

transmitting, to a seller-side system, a request to validate the purchase order, the seller-side system being configured to implement one or more nodes of the blockchain platform the seller-side system being further configured to receive and process orders on behalf of a seller;

instantiating a transaction document in response to receiving an indication from the seller-side system that the purchase order is successfully validated, including the purchase information into the transaction document, and recording the transaction document in a cryptographically protected ledger of the blockchain platform; and progressively updating the transaction document with information provided by the purchaser-side system and the seller-side system as the purchase order is being fulfilled, wherein each update to the transaction document is recorded in the cryptographically protected ledger, wherein the transaction document is dedicated to storing information related to only one purchase order, and wherein updating the transaction document includes inserting an invoice associated with the purchase order in the transaction document, inserting seller remittance data that is associated with a payment corresponding to the invoice into the transaction document, inserting purchaser remittance data that is associated with the payment into the transaction document, and inserting one or more status updates into the transaction document.

7. The system of claim 6, wherein progressively updating the transaction document includes:

receiving from the purchaser-side system a new value for a data item that has already been entered into the transaction document, generating a new version of the transaction document by replacing a current value of the data item with the new value, and recording the new version of the transaction document into the cryptographically protected ledger.

8. The system of claim 7, wherein progressively updating the transaction document includes:

receiving from the purchaser-side system a new value for a data item that has already been entered into the transaction document, detecting whether a condition for updating the data item is satisfied, generating a new version of the transaction document by replacing a current value of the data item with the new value, the current value of the data item being replaced with the new value only when the condition is satisfied, and recording the new version of the transaction document into the cryptographically protected ledger.

9. The system of claim 6, wherein the seller remittance data includes a serial number under which the payment is recorded in an accounting system of the seller.

10. The system of claim 6, wherein the transaction document includes an identifier corresponding to at least one shipment that is associated with the purchase order.

11. The system of claim 6, wherein the purchaser remittance data includes a serial number accorded to the payment by the purchaser-side system.

12. A non-transitory computer-readable medium configured to store one or more processor executable instructions, which when executed by one or more processors cause the one or more processors to perform the operations of:

receiving, at a blockchain platform, a purchase order, the purchase order being associated with purchase information that identifies a product, a product quantity, and a first order identifier that is assigned to the purchase order by a purchaser-side system, the purchase order being received from the purchaser-side system, the purchaser-side system being configured to implement one or more nodes of the blockchain platform, the purchaser-side system being further configured to place and process orders on behalf of a purchaser;

transmitting, by the blockchain platform, a request to validate the purchase order, the request being transmitted to a seller-side system, the seller-side system being configured to implement one or more nodes of the blockchain platform, the seller-side system being further configured to receive and process orders on behalf of a seller;

instantiating a transaction document in response to receiving an indication from the seller-side system that the purchase order is successfully validated, including the purchase information into the transaction document, and recording the transaction document in a cryptographically protected ledger of the blockchain platform; and progressively updating the transaction document with information provided by the purchaser-side system and the seller-side system as the purchase order is being fulfilled, wherein each update to the transaction document is recorded in the cryptographically protected ledger, wherein the transaction document is dedicated to storing information related to only one purchase order, and wherein updating the transaction document includes inserting an invoice associated with the purchase order in the transaction document, inserting seller remittance data that is associated with a payment corresponding to the invoice into the transaction document, inserting purchaser remittance data that is associated with the payment into the transaction document, and inserting one or more status updates into the transaction document.

13. The non-transitory computer-readable medium of claim 12, wherein progressively updating the transaction document includes:

receiving from the purchaser-side system a new value for a data item that has already been entered into the transaction document, generating a new version of the transaction document by replacing a current value of the data item with the new value, and recording the new version of the transaction document into the cryptographically protected ledger.

14. The non-transitory computer-readable medium of claim 13, wherein progressively updating the transaction document includes:

receiving from the purchaser-side system a new value for a data item that has already been entered into the transaction document, detecting whether a condition for updating the data item is satisfied, generating a new version of the transaction document by replacing a current value of the data item with the new value, the current value of the data item being replaced with the new value only when the condition is satisfied, and recording the new version of the transaction document into the cryptographically protected ledger.

15. The non-transitory computer-readable medium of claim 12, the purchaser remittance data includes a serial number accorded to the payment by the purchaser-side system.

16. The non-transitory computer-readable medium of claim 12, wherein the transaction document includes an identifier corresponding to at least one shipment that is associated with the purchase order.

* * * * *